United States Patent [19]

Mahil et al.

[11] Patent Number: 5,055,504

[45] Date of Patent: Oct. 8, 1991

[54] SURFACE COATING COMPOSITIONS

[75] Inventors: Mahinder S. Mahil, Thorley; John M. Cruden, Harlow, both of England

[73] Assignee: Harlow Chemical Company Limited, Harlow, England

[21] Appl. No.: 378,135

[22] Filed: Jul. 11, 1989

[51] Int. Cl.$^5$ ............................ C08L 3/02; C08L 1/00; B32B 7/00

[52] U.S. Cl. .................................... 524/48; 524/734; 428/260; 428/560

[58] Field of Search .................. 524/48, 734; 428/260, 428/560

[56] References Cited

U.S. PATENT DOCUMENTS

| | | | |
|---|---|---|---|
| 2,976,178 | 3/1961 | Pahl et al. | 524/48 |
| 3,200,091 | 8/1965 | Sederlund et al. | 524/48 |
| 3,684,749 | 8/1972 | Arai et al. | 524/18 |
| 3,692,713 | 9/1972 | Columbus et al. | 524/48 |
| 4,835,212 | 5/1989 | Degen et al. | 524/734 |

FOREIGN PATENT DOCUMENTS

| | | |
|---|---|---|
| 888487 | 1/1962 | United Kingdom . |
| 919682 | 2/1963 | United Kingdom . |
| 1278813 | 6/1972 | United Kingdom . |
| 1594120 | 7/1981 | United Kingdom . |

*Primary Examiner*—Nathan M. Nutter
*Attorney, Agent, or Firm*—Merchant, Gould, Smith, Edell, Welter & Schmidt

[57] ABSTRACT

An adhesive composition is derived from an acrylate ester polymer, dextrin, a surfactant and optionally a tackifier.

14 Claims, No Drawings

SURFACE COATING COMPOSITIONS

This invention relates to surface coating compositions and to products employing them. More especially, it relates to compositions suitable for use as pressure sensitive adhesives.

Pressure sensitive adhesives have long been used to adhere, for example, tapes and labels to substrates, and this use continues to increase in popularity. Adhesive compositions of this type are often supplied to the user in organic solution, and are frequently based on acrylic ester polymers with or without a tackifying resin. There remains a need for a composition not requiring an organic solvent, which is capable of accepting high tackifier level without an unacceptable loss in adhesive strength, and which has higher shear strength than known compositions derived from acrylic ester polymers.

The present invention provides a composition comprising dextrin, a surfactant, a polymer a major proportion of the repeating units of which are derivable from an acrylate of at least one saturated aliphatic alcohol having from two to twelve carbon atoms, the composition optionally also containing a tackifier. If a tackifier is present, the dextrin level may be up to 7%, based on the total weight of dextrin, surfactant, and acrylate polymer (hereinafter referred to as "the specified components"); in the absence of tackifier, the maximum dextrin level is 3.5%, based on the total weight of the specified components. The invention also provides the composition in the form of an aqueous dispersion, as well as in the form of a layer on a substrate.

The composition is advantageously made by polymerizing an acrylic ester of at least one saturated aliphatic alcohol having from two to twelve carbon atoms in the presence of a surfactant and dextrin, the polymerization advantageously being carried out in an aqueous medium.

It is believed that, when the composition of the invention is made by the above-described procedure, some of the dextrin and some of the acrylate polymer will be bound together, in the form of a graft copolymer. In the values given herein for proportions of components said to be essential, advantageous, or preferred, however, this possibility is disregarded.

Whether a tackifier is present or not, the dextrin level is advantageously at least 0.2%, and is preferably within the range of from 0.5% to 3.0%, by weight, of the specified components if no tackifier is present or within the range of from 0.5% to 5% if a tackifier is present. Below the 0.2% level, the increase in shear strength compared with an otherwise similar acrylate composition is not significant, while above the maxima the composition shows reduced tack.

Advantageously, the surfactant is present in the composition in a proportion of from 1 to 15, preferably from 5 to 10, percent by weight of the specified components. The surfactant may be nonionic, anionic, cationic or amphoteric; and any one composition may contain two or more members of any one category or one or more members of two or more categories of surfactant.

As nonionic surfactants, there are preferred the condensation products of one or more molecules of ethylene oxide and a hydrophobe, for example a condensate of octyl or nonyl phenol in which the alkyl chains may be linear or branched, with up to 100, advantageously between 4 and 40, moles of ethylene oxide; a condensate of ethylene oxide with a monohydric aliphatic alcohol, the chain of which may be linear or branched and which, advantageously, contains from 8 to 18 carbon atoms, and a condensate of ethylene oxide with a fatty acid or fatty acid amide. Other ethylene oxide condensates of value include those with polypropylene oxide and acetylenic glycols.

As anionic surfactants, there may be mentioned the salts, preferably the alkali metal and ammonium salts, of alkyl sulphates and sulphonates or of alkyl aryl sulphonates, e.g., sodium lauryl sulphate, sodium dodecyl benzenesulphonate or disodium dodecyl diphenyl ether sulponate; salts of mono-and di-esters of sulphosuccinic acid, e.g., sodium di 2-ethylhexyl sulphosuccinate or disodium isododecyl sulphosuccinate; salts of alkyl sulphosuccinamates, of sulphated oils, of alkyl phosphates, or of ethoxylated alkyl phosphates. There may also be mentioned salts of sulphated nonionic surfactants, e.g., sodium lauryl ether sulphate.

As cationic surfactants there may be mentioned certain amino compounds, for example quaternary ammonium salts with long chain alkyl groups, for example, cetyl trimethylammonium bromide. As examples of amphoteric surfactants may be mentioned the salts of alkyl sulpho betaines.

The polymer is advantageously present in the composition in a major proportion; preferably in a proportion within the range of from 65 to 95, and most preferably from 75 to 90, percent based on the weight of the specified components. The specified components, including tackifiers, advantageously represent at least 85% by weight of the solids content of the composition, preferably at least 95%. Units derivable from, advantageously derived from, the acrylic ester of a monohydric saturated aliphatic alcohol with from two to twelve, advantageously from four to twelve, and preferably from four to eight, carbon atoms, advantageously constitute at least 60%, preferably at least 70%, by weight of the polymer, and the polymer may consist of such units. Exceptionally, when the polymer is a copolymer of the acrylic ester with ethylene and/or a vinyl ester, e.g., vinyl acetate or propionate, a proportion of acrylic ester lower than 70% is preferred.

Advantageously, the acrylic ester is n-butyl acrylate, 2-ethylhexyl acrylate, or a mixture thereof, though ethyl, iso-butyl, n-hexyl, n-heptyl, 2-ethylbutyl, and lauryl acrylates are also suitable. If a mixture of two or more acrylates is used, one of the acrylates is advantageously of an alcohol with at least 4 carbon atoms (and if butyl is advantageously n-butyl alcohol).

As units other than the specified units of the polymer there may be mentioned units derived from acrylates of alcohols other than those specified, of methanol, aliphatic alcohols with 13 or more carbon atoms, alkaryl and aralkyl alcohols, alcohols with substituents, e.g., the haloalkanols and cyanoalkanols, acrylic esters of poly-(ethylene and/or propylene oxide) and the monoalkyl or monoaryl ethers of such polyalkylene oxides; advantageously, the poly(alkylene oxide) has a chain length of from 2 to 30 units.

Vinyl esters are advantageous comonomers, preferably esters of saturated monocarboxylic acids with from 2 to 18 especially 2 to 12, carbon atoms. As examples, there may be mentioned vinyl acetate, propionate, 2-ethylhexanoate and laurate. Vinyl ethers, for example vinyl iso-butyl ether, may usefully be incorporated in the composition, enhancing tack. The mono and di esters of itaconic, maleic and fumaric acids with alcohols with from 1 to 8 carbon atoms, especially dibutyl fumarate, may also be incorporated. Other suitable monomers include styrene, substituted styrene, butadiene, isoprene, acrylonitrile, methacrylonitrile, ethylene, isobutylene, vinyl chloride, and vinylidene chloride.

Monomers other than those given above may be incorporated at relatively low levels, for example from 0.1% to 5.0%. These may be included to improve adhesion to certain substrates, to provide cross-linking of the polymer system, or to help to stabilize the polymer dispersion. Certain monomers can perform more than one of these functions simultaneously.

Monomers which may be used to improve adhesion to particular substrates include: unsaturated carboxylic acids, for example, acrylic acid, methacrylic acid, itaconic acid and fumaric acid; acrylamide and methacrylamide and their N-substituted derivatives, e.g., N-methylolacrylamide, N-t-butyl acrylamide, N-methoxymethyl methacrylamide, N-isobutoxy acrylamide; condensates of acrylamide or methacrylamide with glyoxylic acid; hydroxyalkyl esters of unsaturated carboxylic acids, for example, hydroxyethyl acrylate, hydroxypropyl acrylate, hydroxyethyl methacrylate, hydroxypropyl methacrylate, bis-hydroxypropyl itaconate; glycidyl methacrylate; monomers containing acetoacetate groups, e.g., allyl acetoacetate or the acetoacetate of 2-hydroxyethyl methacrylate; monomers containing ureido groups such as Sipomer WAM$^R$, which is the allyl ester of a complex ureido-containing monomer, methacryloxyacetamido ethylene urea, ureido methoxy ethyl acrylate; hydrazides of copolymerizable unsaturated acids e.g. acrylic or methacrylic hydrazides; unsaturated ketones e.g., vinyl methyl ketone or diacetone acrylamide, and their hydrazones.

As examples of monomers with more than one polymerizable double bond which may be incorporated to introduce cross-linking and thus raise the overall molecular weight of the adhesive there may be mentioned: divinyl benzene, ethylene glycol dimethacrylate; trimethylol propane triacrylate; diallyl maleate, and hexane-1,6-diol dimethacrylate.

Monomers which may be incorporated to assist in the stabilization of the polymer latex include the unsaturated acids and amides listed above, and also monomers with sulphate, sulphonate or phosphate groups, for example sodium vinyl sulphonate; sodium styrene sulphonate; sodium acrylamido propane sulphonate; sodium 2-ethyl sulphato methacrylate; and sodium vinyl phosphate.

Advantageously, the polymer has a Tg, as measured by differential scanning calorimetry (DSC), of at most $-20°$ C. Advantageously, the DSC Tg of the polymer is in the range $-50°$ C. to $-70°$ C., preferably from $-65°$ C. to $-70°$ C.

The composition may also comprise additives to modify the rheology of the composition when in the form of a dispersion, or to improve mechanical or compounding stability. Examples of such additives are water soluble polymeric stabilizers, for example, polyvinyl alcohol, hydroxyethyl cellulose, sodium carboxymethyl cellulose, polyvinyl pyrrolidone and gum arabic. The specified alkyl acrylate polymer, together with the tackifier, if present, will, however, advantageously represent a major proportion by weight of the macromolecular material in the composition, and preferably represents at least 75% by weight thereof.

When the compositions are prepared, as is preferred, by emulsion polymerization, any technique generally suitable for such polymerization may be employed. The process is conveniently carried out at any temperature from 0° C. to 100° C., but preferably from 20° C. to 90° C.

A polymerization initiator is required; this is most conveniently chosen from products well known in emulsion polymerization, for example, ammonium peroxydisulphate, potassium peroxydisulphate, potassium peroxydiphosphate or hydrogen peroxide. At the lower temperatures these will normally be used in conjunction with a reducing agent such, for example, as sodium bisulphite, sodium formaldehyde sulphoxylate or ascorbic acid. These reducing agents may also be used conveniently with organic hydroperoxides such, for example, as t.butyl hydroperoxide or cumene hydroperoxide. Another class of initiators which may conveniently be used are azo compounds such, for example, as azo bis isobutyronile or azo bis isobutyric acid. The cationic initiator 2,2'-azobis (N,N'-dimethylene isobutyramidine) dihydrochloride is especially suitable if a cationic dispersion is being prepared.

The composition, whether the dispersion resulting from the polymerization carried out as described above or otherwise, may be employed directly as an adhesive coating composition. Advantageously, the composition is applied as an aqueous dispersion, advantageously with a solids content of at least 35% by weight, preferably at least 45% by weight. The dispersion may be employed without further additives, but other components may be employed to obtain specific properties, e.g., colorants, antioxidants, bactericides, fungicides or additional solvents, e.g., xylene or acetone, plasticizers, e.g., phthalic or adipic acid esters, and thickeners, e.g., polyvinyl alcohol, water- or alkali-soluble polyacrylates, or polyethylene oxide diisocyanate condensates.

Specially important additives, however, include tackifiers, especially tackifying resins. As suitable resins, there may be mentioned those derived from rosin acids, obtained from, for example, gum or wood rosin, which may be stabilized by disproportionation, hydrogenation, dimerization or polymerization. Especially suitable are stabilized rosin acid esters, the esters being of mono, or di or higher polyhydric alcohols, for example, one or more of methanol, ethanol, ethylene glycol, glycerol and pentaerythritol may be used. Other tackifiers include low molecular weight polymers of styrene, alpha methyl styrene and cyclopentadiene.

The proportion of the total composition constituted by the tackifier if present, based on the total solids content of the composition, may be up to 50% by weight. One range of preferred compositions contains from 40% to 50% by weight of tackifier, such compositions being useful as general purpose adhesives; a second preferred range contains from 10 to 15% by weight of tackifier, such compositions having good low temperature properties. The appropriate proportion of tackifier in the composition to some extent depends on the proportion of the dextrin in the said components, a higher proportion of tackifier enabling a higher dextrin content to be employed, giving the higher shear strength we have found to be associated with the use of dextrin while compensating at least in part for the loss in tack. For example, good results are obtained with a tackifier content of 40% and a dextrin level of 5%, similarly good results may be obtained with a tackifier content of 20% and a dextrin level of 2%. Advantageously the dextrin is one obtainable by the hydrolysis of potato starch, since the composition in the form of an aqueous dispersion remains workable within a wide temperature range when such a dextrin is used. Materials employing dextrins obtainable from other starches are, however, also within the scope of the invention.

Advantageously, the dextrin has a viscosity, at 25° C. in a 37% by weight aqueous solution, of at most 100 MPas. measured in a Ostwald viscometer. Suitable commercially available potato starch dextrins include those sold under the trade marks EMDEX and AVEDEX, especially Emdex 30 AN 45 and Avedex 36 LAC 14G and 37 LAC 19.

The following examples, in which all parts and percentages are by weight, illustrate the invention:

EXAMPLE 1

|  | Parts |
|---|---|
| Initial Reactor Charge | |
| Water | 25.00 |
| Aerosol MA (80%) | 0.50 |
| Monomer Charge | |
| 2-Ethylhexyl Acrylate | 55.10 |
| Methyl Methacrylate | 2.90 |
| Initiator Solutions | |
| Potassium Persulphate | 0.02 |
| Water | 0.38 |
| Sodium Formaldehyde Sulphoxylate | 0.02 |
| Water | 0.18 |
| Delayed Surfactant/Initiator Solution | |
| Dowfax 2A1 (45%) | 1.50 |
| Aerosol MA (80%) | 0.50 |
| Potassium Persulphate | 0.12 |
| Water | 13.56 |
| Post Treatment | |
| t.Butyl Hydroperoxide | 0.02 |
| Sodium Formaldehyde Sulphoxylate | 0.02 |
| Water | 0.18 |

Aerosol MA is sodium dihexyl sulphosuccinate. Dowfax 2Al is disodium dodecyl diphenyl ether.

The initial charge was added to a polymerization reactor immersed in a thermostatically controlled water bath and fitted with a stirrer, reflux condenser, and the means for the continuous addition of monomers and the surfactant/initiator solution. The reactor and its contents were heated to 60° C. at which temperatures 10% of the monomer charge was added followed by the initiator solutions. The charge was then heated to 90° C. and held for thirty minutes to complete polymerization of the initial monomers.

At the end of this period the simultaneous addition was commenced of the remaining monomers and of the surfactant/initiator solution. These additions were completed in five hours, the batch temperature being held at 90° C. for a further hour thereafter. After cooling, the post treatment materials were then added to reduce free monomer levels.

EXAMPLES 2 to 7

These are identical to Example 1 save that the dextrin Avedex 37 LAC 19 is included in the initial reactor charge at the following levels, shown as percentage of total charge.

| Example 2 - 0.25 | Example 3 - 0.50 |
|---|---|
| Example 4 - 0.75 | Example 5 - 1.00 |
| Example 6 - 1.50 | Example 7 - 2.00 |

The emulsions prepared in Example 1 to 7 had the following physical properties:

| Example | 1 | 2 | 3 | 4 | 5 | 6 | 7 |
|---|---|---|---|---|---|---|---|
| Solids Content. % | 60.6 | 60.0 | 59.8 | 60.6 | 60.6 | 60.3 | 60.2 |
| Particle Size (nm) | 480 | 360 | 330 | 360 | 375 | 360 | 345 |
| Brookfield Viscosity (cp) RVT 4/20 | 150 | 250 | 640 | 1220 | 1200 | 1580 | 2100 |
| Dextrin as % of specified components (approx.) | 0.0 | 0.1 | 0.83 | 1.25 | 1.65 | 2.49 | 3.32 |

The Tg of the polymer of Example 5, measured in the presence of the dextrin, was −66° C., the other polymers having similar values, rising somewhat with higher proportions of dextrin present.

These products were then evaluated as adhesives, the shear strength and tack of the polymers being measured as follows:

The polymer emulsion was bar-coated directly on 36 micron Mylar D polyester film so as to achieve a continuous film, free from defects, with a dry coat weight of 20 g/m$^2$. The emulsion was dried at 90° C. in an oven with fan assisted air circulation.

The adhesive film was then laminated to a silicone coated release backing and stored at 23° C.±2° C. and 50%±5% R.H. for 24 hours before evaluation.

TEST METHODS a. Shear Adhesion: As per FINAT test method No. 8, but a test load of 1.8 Kg used instead of specified 1 Kg.
b. Loop Tack (glass): As per FINAT test method No. 9.
c. Polyloop Tack (Polyethylene): Modification of FINAT test method No. 9.

In the shear adhesion test, the time (in mins) for a test sample to be pulled by the weight from a glass plate at an angle of 2° to the vertical is measured. In the tack tests, a loop of a sample is allowed to contact, very briefly, a glass or polyethylene plate 25 mm square and the force required, in Newtons, to remove it is measured.

The following results were obtained:

| Example | Dextrin Level, % (a) | Dextrin Level, % (b) | Shear Strength (mins) | Loop Tack (N) glass | Loop Tack (N) polythene |
|---|---|---|---|---|---|
| 1. | 0 | 0 | 25 | 5.2 | 1.9 |
| 2. | 0.25 | 0.41 | 207 | 5.5 | 1.1 |
| 3. | 0.50 | 0.83 | 1,140 | 5.7 | 1.4 |
| 4. | 0.75 | 1.25 | 1,800 | 5.5 | 1.9 |
| 5. | 1.00 | 1.65 | >10,000 | 4.9 | 1.5 |
| 6. | 1.50 | 2.49 | >10,000 | 4.9 | 1.2 |
| 7. | 2.00 | 3.32 | >10,000 | 4.7 | 0.9 |

(a) on dispersion
(b) on specified components (approximate)

These results show the dramatic increase in shear strength obtained by the inclusion of low levels of dextrin in the emulsion composition. The reduction in tack with the higher dextrin levels is quite moderate.

EXAMPLE 8 to 12

The same basic formulation as Example 1 was used in the preparation of Example 8, with the monomer charge altered to a composition of 45% 2-ethylhexyl acrylate, 45% n-butyl acrylate and 10% vinyl acetate. Examples 9 to 12 were modified by the addition of Avedex 37 LAC 19 as before. The latices formed had the following physical properties:

| Example | 8 | 9 | 10 | 11 | 12 |
|---|---|---|---|---|---|
| Dextrin, % on dispersion | 0 | 0.25 | 0.50 | 0.75 | 1.00 |
| Dextrin, % solids (approximate) | 0 | 0.42 | 0.85 | 1.27 | 1.68 |
| Solids Content | 59.8 | 58.9 | 58.9 | 59.0 | 59.5 |
| Particle Size (nm) | 200 | 190 | 180 | 175 | 215 |
| Brookfield Viscosity (Poise) | 109 | 69 | 107 | 114 | 53 |

The Tg of the polymer of Example 12 was −54° C.; other polymers have similar values, with lower dextrin levels giving lower Tg's.

These products were evaluated as pressure sensitive adhesives as described above and the following values of shear strength and loop tack were obtained:

| Example | Shear Strength (mins) | Loop Tack (N) Glass | Polythene |
|---|---|---|---|
| 8. | 9 | 5.9 | 2.5 |
| 9. | 12 | 5.9 | 1.5 |
| 10. | 18 | 6.4 | 2.5 |
| 11. | 27 | 5.6 | 1.8 |
| 12. | 240 | 5.7 | 1.5 |

EXAMPLES 13 to 22

Example 13 was identical to Example 1 save for the use of acrylonitrile in place of methyl methacrylate. Examples 14 to 22 were modified as before with the dextrin grade Avedex 37 LAC 19.

The latices obtained had the following physical properties:

| Example | Dextrin Level, % (a) | (b) | Solids Content | Particle Size (nm) | Brookfield Viscosity RVT 4/20 cp |
|---|---|---|---|---|---|
| 13. | 0 | | 60.6 | 450 | 90 |
| 14. | 0.25 | 0.41 | 60.5 | 360 | 240 |
| 15. | 0.50 | 0.83 | 60.6 | 420 | 620 |
| 16. | 0.75 | 1.24 | 60.7 | 490 | 810 |
| 17. | 1.00 | 1.66 | 60.4 | 360 | 970 |
| 18. | 1.50 | 2.48 | 60.4 | 530 | 2700 |
| 19. | 2.00 | 3.33 | 60.0 | 470 | 2500 |

(a) on dispersion
(b) on solids (approximate)

These products were evaluated for shear strength and Loop Tack as before and the following results obtained:

| Example | Shear Strength (mins) | Loop Tack (N) Glass | Polythene |
|---|---|---|---|
| 13. | 84 | 6.9 | 4.6 |
| 14. | 211 | 6.0 | 4.1 |
| 15. | 155 | 5.1 | 3.1 |
| 16. | 165 | 5.1 | 2.5 |
| 17. | 260 | 5.0 | 2.8 |
| 18. | 378 | 3.9 | 1.5 |
| 19. | 340 | 3.8 | 1.8 |

These results show the steady increase in the shear strength of the adhesive as the dextrin level is increased. The reduction in tack at the highest levels is also shown.

EXAMPLES 20, 21

| | Examples 20 | 21 |
|---|---|---|
| Initial Reactor Charge | | |
| Antarox C0770 | 0.50 | 0.50 |
| Emdex 30AN45 | — | 1.50 |
| Water | 36.50 | 35.00 |
| Monomer Charge | | |
| 2-Ethylhexyl Acrylate | 47.50 | 47.50 |
| Acrylonitrile | 2.50 | 2.50 |
| Initiator Solution | | |
| VA-044 (2.2 azobis N,N' dimethylene isobutyramidine dihydrochloride) | 0.10 | 0.10 |
| Water | 0.90 | 0.90 |
| Delayed Stabilizer, Initiator Solution | | |
| Cetyl Trimethyl Ammonium Bromide | 2.00 | 2.00 |
| VA-044 | 0.15 | 0.15 |
| Water | 9.35 | 9.35 |
| Final Initiator Solution | | |
| VA-044 | 0.05 | 0.05 |
| Water | 0.45 | 0.45 |

These cationic latices were prepared in a manner similar to Example 1. The initial charge was added to the reactor and heated to 60° C. at which temperature 10% of the monomer mixture was added followed by the initiator solution. The reactor was heated to 90° C. and held for thirty minutes to allow the initial polymerization to take place. At the end of this period the simultaneous addition was started of the monomers and the stabilizer/initiator solution. This was completed in five fours. The final initiator solution was then added and the emulsion held at 90° C. for a further hour before cooling.

The emulsions produced had the following properties:

| Example | Solids Content, % | Particle Size (nm) | Brookfield Viscosity RVT 4/20 cp |
|---|---|---|---|
| 20. | 49.7 | 275 | 400 |
| 21. | 52.5 | 300 | 490 |

When evaluated as adhesives as described above the following results were obtained:

| Example | Shear Adhesion | Loop Tack (N) (Glass) |
|---|---|---|
| 20. | 30 mins | 5.8 |
| 21. | 180 mins | 1.6 |

These results again demonstrate the effect of the dextrin incorporation in raising the shear adhesion of the polymer adhesive. In these particular examples the polymer tack is reduced.

EXAMPLES 22 to 24

These are based on Examples 3, 5 and 7 respectively. The emulsions were modified with the tackifying resin Hercules MBG64 which is a 55% aqueous dispersion of a stabilized rosin ester resin with a softening point of about 70° C. The tackifying resin dispersion was added in sufficient quantity to give an adhesive composition of 60% acrylic polymer and 40% tackifying resin. Adhesives tapes were prepared and tested as before with the following results:

| Example | Dextrin Level in Emulsion, % | Shear Adhesion (mins) | Polyloop Tack (N) |
| --- | --- | --- | --- |
| 22. | 0.5 | 15 | 5.0 |
| 23. | 1.0 | 50 | 3.1 |
| 24. | 2.0 | 95 | 4.6 |

These results demonstrate that the improved shear adhesion obtained with increasing dextrin levels is characteristic of the compounded adhesives as well as of the base emulsion polymers.

EXAMPLES 25 to 27

These are based on latices with the same general composition as Examples 8 to 12, but with dextrin levels of 1%, 2% and 4% respectively. They were compounded with Hercules MBG45 as with Examples 22 to 24 and the following adhesive results were obtained:

| Example | Dextrin Level in Emulsion, % | Shear Adhesion (mins) | Polyloop Tack (N) |
| --- | --- | --- | --- |
| 25. | 1 | 10 | 7.4 |
| 26. | 2 | 15 | 10.4 |
| 27. | 4 | 32 | 11.4 |

The relationship between dextrin level and shear adhesion value is again clear.

EXAMPLES 28 to 30

These are based on the formulation of Example 13, with the specified levels of dextrin, and with the tackifying resin Hercules MBG64 added as in Examples 22 to 24. The following results were obtained:

| Example | Dextrin Level in Emulsion, % | Shear Adhesion (mins) | Polyloop Tack (N) |
| --- | --- | --- | --- |
| 28. | 0.25 | 28 | 11.8 |
| 29. | 1.00 | 58 | 11.8 |
| 30. | 3.00 | 125 | 10.3 |

The relationship between dextrin level and shear adhesion values is again clear.

EXAMPLES 31 to 33

Like Examples 22 to 24 there are based on Examples 3, 5 and 7 but the level of tackifying resin was reduced from 40% to 20% based on the overall adhesive composition. The following adhesive results were obtained.

| Example | Dextrin Level in Emulsion, % | Shear Adhesion (mins) | Polyloop Tack (N) |
| --- | --- | --- | --- |
| 31. | 0.5 | 34 | 4.7 |
| 32. | 1.0 | 76 | 2.9 |
| 33. | 2.00 | 205 | 3.2 |

EXAMPLES 34 to 36

These are similar to Examples 22 to 24, but are made using a different tackifying resin dispersion, Snowtack 301CF. This is a 50% solids dispersion of a stabilized rosin acid derivative with a softening point of about 60° C. The following adhesive results were obtained:

| Example | Dextrin Level in Emulsion, % | Shear Adhesion (mins) | Polyloop Tack (N) |
| --- | --- | --- | --- |
| 34. | 0.5 | 6 | 8.5 |
| 35. | 1.0 | 10 | 6.3 |
| 36. | 2.0 | 25 | 9.1 |

EXAMPLES 37 to 39

These are identical to Examples 28 to 30 save that 5% toluene, calculated on the total adhesive dispersion weight, was added with the tackifier dispersion to facilitate its incorporation. The adhesive results are not greatly changed:

| Example | Dextrin Level in Emulsion, % | Shear Adhesion (mins) | Polyloop Tack (N) |
| --- | --- | --- | --- |
| 37. | 0.25 | 26 | 9.6 |
| 38. | 1.00 | 36 | 9.6 |
| 39. | 3.00 | 130 | 9.9 |

What we claim is:

1. A composition comprising dextrin, a surfactant, a polymer, at least 50% by weight of the repeating units of which are derivable from an acrylate of at least one saturated aliphatic alcohol having from two to twelve carbon atoms, and, optionally, a tackifier, the dextrin level being at most 7%, based on the total weight of dextrin, surfactant, and acrylate polymer if a tackifier is present, the maximum dextrin level being 3.5% in the absence of a tackifier.

2. A composition as claimed in claim 1, wherein a tackifier is present, and which comprises from 0.2% to 5% by weight of dextrin, based on the total weight of surfactant, dextrin and acrylate polymer.

3. A composition as claimed in claim 1, wherein no tackifier is present, and which comprises from 0.2% to 3% by weight of dextrin, based on the total weight of surfactant, dextrin and acrylate polymer.

4. A composition as claimed in claim 3, wherein the surfactant is present in the composition in a proportion of from 1% to 15%, by weight, based on the weight of surfactant, dextrin, and acrylate polymer.

5. A composition as claimed in claim 1, wherein the polymer is present in the composition in a proportion of from 65% to 95%, be weight, based on the weight of the dextrin, surfactant and acrylate polymer.

6. A composition as claimed in claim 1, wherein the acrylate units are derived from the acrylic ester of a monohydric saturated aliphatic alcohol with from four to twelve carbon atoms.

7. A composition as claimed in claim 1, wherein the acrylate units constitute at least 60% by weight of the polymer.

8. A composition as claimed in claim 1, wherein the acrylic ester is n-butyl acrylate, 2-ethylhexyl acrylate, or a mixture thereof.

9. A composition as claimed in claim 1, wherein the polymer is one obtained by polymerization in the presence of the surfactant and dextrin.

10. A composition as claimed in claim 1, which comprises a tackifier, wherein the tackifier constitutes up to 50% by weight of the total solids content of the composition.

11. A composition as claimed in claim 1, wherein a tackifier is present and the tackifier is a tackifying resin.

12. A composition as claimed in claim 1, in the form of an aqueous dispersion.

13. An article having a layer of a composition as claimed in claim 1, on a surface thereof.

14. A sheet substrate having a layer of a composition as claimed in claim 1, on a surface thereof.

* * * * *